(No Model.) 2 Sheets—Sheet 1.
J. FLEISCHER, H. W. MÜLLER, & J. G. ARNOLD.
GAS REGULATOR.
No. 324,762. Patented Aug. 18, 1885.
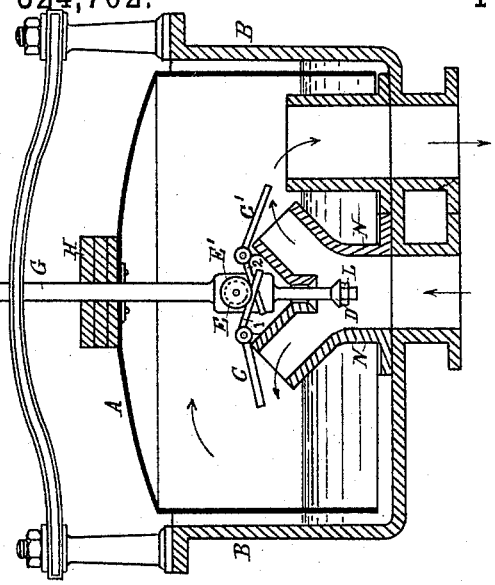
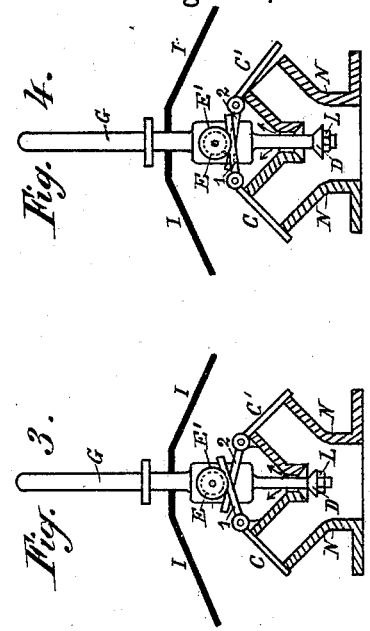
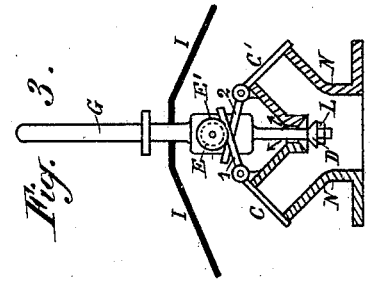
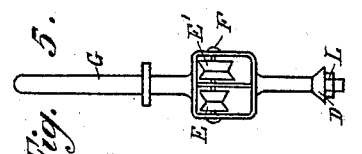
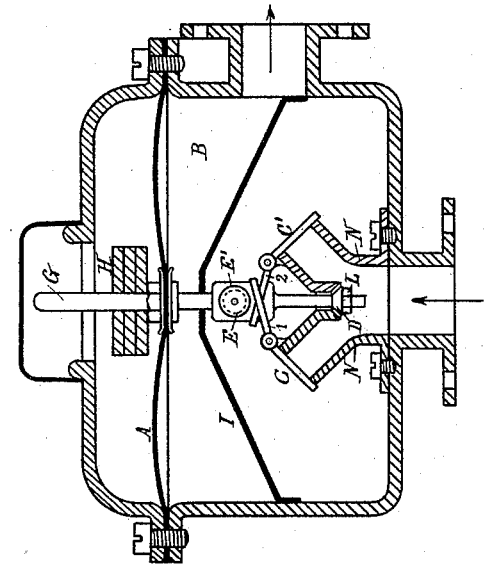
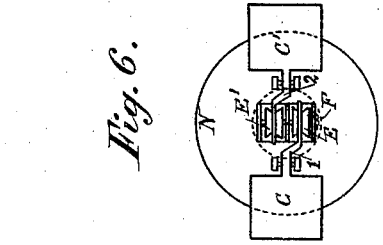
Witnesses:
John Enders Jr
T. R. Harding.
Inventor
Johannes Fleischer
Hieronymus Wilhelm Müller
Johann Georg Arnold
O. E. Duffy
Attorney.
N. PETERS. Photo-Lithographer, Washington, D. C.

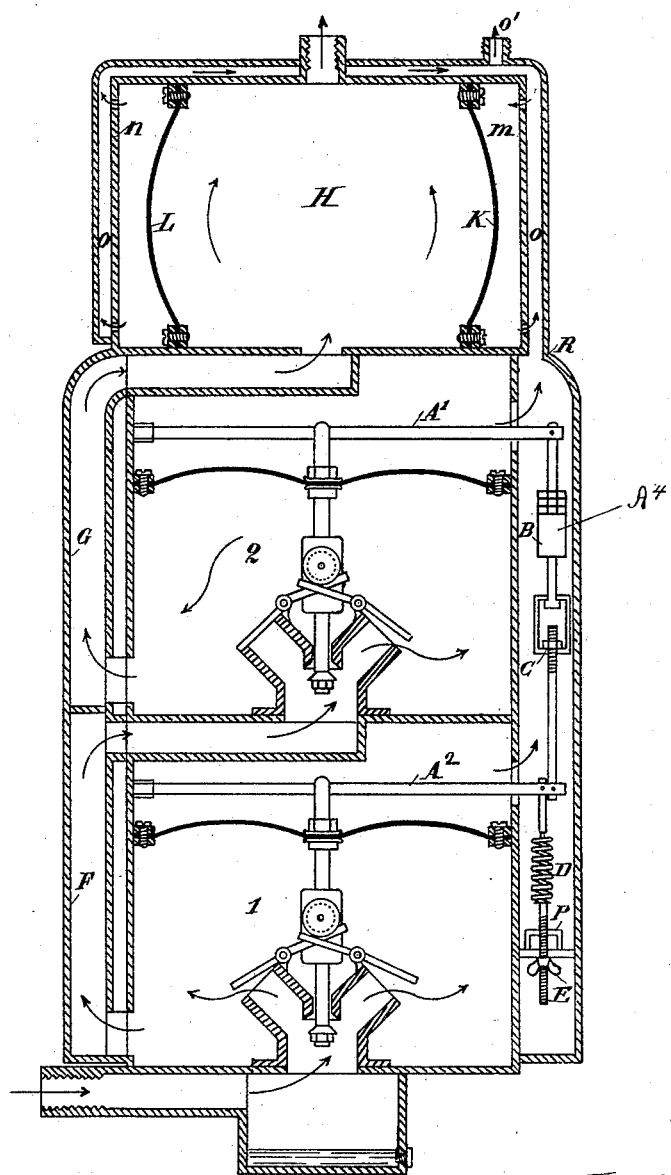

UNITED STATES PATENT OFFICE.

JOHANNES FLEISCHER, HIERONYMUS WILHELM MÜLLER, AND JOHANN GEORG ARNOLD, OF FRANKFORT-ON-THE-MAIN, GERMANY.

GAS-REGULATOR.

SPECIFICATION forming part of Letters Patent No. 324,762, dated August 18, 1885.

Application filed April 16, 1885. (No model.) Patented in Germany June 19, 1884, No. 30,176, and in France August 7, 1884, No. 163,672.

*To all whom it may concern:*

Be it known that we, JOHANNES FLEISCHER, HIERONYMUS WILHELM MÜLLER, and JOHANN GEORG ARNOLD, citizens of the German Empire, residing at Frankfort-on-the-Main, have invented new and useful Improvements in Gas-Regulators, of which the following is a specification.

The gas-pressure regulator shown in Figures 1 to 7 of the accompanying drawings has for its object to reduce the supply of gas to that pressure which is necessary for its economical consumption.

The regulator may be used for the largest or the smallest consumption, and it is immaterial whether it is used with a hydraulic seal—that is to say, with a bell dipping into a sealing-liquid to prevent the passage of gas, as shown in Fig. 2—or in smaller sizes with a double diaphragm, Figs. 1 and 7.

The regulator consists, essentially, in the reservoir B, Figs. 1 and 2, the double diaphragm or the immersed bell A, Figs. 1 and 2, which may both be loaded with weights H, and loosely connected with the guide-rod G of the valves C and C', in the lower part of which are provided two guide-rollers, E E', of different size, and united by a common spindle, F, Figs. 5 and 6. At the lowermost end of the guide-rod an adjustable conical valve, D, is screwed on and fixed in position by a lock-nut, L.

In the bottom of the reservoir B, Figs. 1, 2, and 7, a flanged piece, N, is screwed fast, which at the inlet is of exactly the same diameter as the pipe by which the apparatus is to be connected with the gas-supply and then divides into three exits.

At the two lateral exits, to the right and left, valves C and C' are mounted on hinges, so as to be free to turn. The lever-arms 1 and 2, Fig. 6, on said valves take under the guide-rollers E E', provided for the same in the rod G, these rollers being of unequal diameters. The conical valve D, with its lock-nut L, fixed on the rod G, completes the whole mechanism and at the same time serves as a guide. The bridge J, provided on the reservoir, Fig. 1, serves as the upper guide for the rod G, while in the arrangement illustrated in Fig. 2 a bridge-piece on the outside serves for the same purpose.

The operation of the apparatus is as follows: The gas enters at the bottom of the reservoir B by the flanged connection or coupling, or it passes into the bell A, as indicated by arrows in Figs. 1, 2, 3, 4, and 7, until these and the pipes connected therewith are filled with gas. By the continued pressure against the diaphragms or the bell A these rise to their highest point and consequently the three valves connected therewith are completely closed, Fig. 1. It must be observed that the two hinged valves, C and C', will, by reason of the position of the levers 1 and 2, shown in Fig. 6, close automatically, and consequently may be substituted for the floating bell A. The third conical valve, D, is opened and closed by the pull of the membranes or the bell—viz., through the gas pressure—and on the other hand by the pressure of the hinged valves C C' by means of their lever-arms 1 and 2 upon the vertical guide-rod G. The bell or the membranes will rise in accordance with the pressure at which the gas is to be allowed to pass off, this being regulated by loading the membranes or the bell, say, with disks of lead H.

Now, for the purpose of always maintaining a uniform pressure at the place where the gas is to be consumed, the valves work alternately. First, by the sinking of the membranes or the bell the conical valve D screwed upon rod G acts. (See Fig. 3.) The consumption of gas being continued, and the membranes or the bell sinking farther, the larger guide-roller, E', on the rod G presses upon the lever 2 of valve C', and opens the same until the position shown in Fig. 4 is reached. At this position, and with a further increase or consumption of gas, the membrane or bell descends still farther, and the smaller roller, E, presses against the other lever-arm of the valve C, and the third valve is now opened. In a further increase in consumption the three valves work in conjunction until their opening is equivalent to the full opening of the supply, Fig. 2, should the entire available supply be required.

Should the consumption be reduced and the pressure beneath the membrane become proportionately increased, the valves are gradually closed in a sequence which is inversely that previously described, so that the conical valve is the last to be closed, and consequently an exceedingly sensitive regulation is effected.

After what has been stated it need only be shortly pointed out that while all low-pressure gas-regulators heretofore known, whether "wet" or "dry," work with a single valve only, either conical or of other shape, in this system three valves are used, first successively, and at last, when full consumption takes place, simultaneously, so that extreme sensitiveness of regulation is attained, which has been specially attainable only by reason of the slight rise of the membrane or bell required in the present construction, while the floats heretofore absolutely required in wet regulators can be dispensed with, and the action is independent of the level at which the water stands, while in the present dry regulator the membrane is subjected to much less strain than heretofore, as it will not, as, for instance, in some cases, be pulled down by a conical valve at the center when the pressure is excessive, thus soon causing leakage. On the contrary, in our system there is a constant tendency, when the weight at H is reduced, to raise the membrane, and this considerably tends to its preservation.

The form of apparatus shown in section in Fig. 7 consists, essentially, in two superposed regulators, 1 and 2, containing the valves constructed, as shown in Figs. 1, 2, 3, 4, 5, and 6, with one or more reservoirs, H, which may be placed one above another or side by side, and having elastic sides K and L, and these will effectively equalize all uneven burning of the flames which might be caused by vibrations in the supply-pipes.

The two regulators 1 and 2 are connected by the pipe F, the connection for the reservoir or reservoirs H being established by the pipe G. The path in which the gas travels is indicated by arrows. The walls $m$ and $n$ protect the double membranes K and L against all willful or accidental damage. These membranes work precisely as has been hereinbefore described.

The safety-tube O is connected with the atmospheric air at pipe O', and prevents all escape of gas into the locality, as it corresponds with little channels R in the walls $m$ $n$, which, when any leakage occurs, allow the gas forthwith to escape into the open air by the tube O, so that explosion or conflagration is prevented.

For loading, a spring-regulator is employed instead of the weigh-disks. This spring device has an adjustment at E, and it allows both the regulators 1 and 2 to be set by means of the levers or beams A A', as follows: The upper beam, A', is connected by the adjustable coupling C, having balance-weights $A^4$, with the lower beam, $A^2$. The spiral spring D fixed on the latter has at its extended lower end a screwed part passing through stuffing-box P, which has a cap for closing it. By turning the thumb-nut E, fitted over the screw-thread, any pressure from one millimeter water can be obtained for the regulators. The spaces above the diaphragms and outside the membranes communicate with the safety-tube O, so as to supply the air required for movement of the regulators 1 2 from outside and to allow it to escape the same way. The path of the air is indicated by barbed arrows.

Having now particularly described and ascertained the nature of our said invention, and in what manner the same is to be performed, we declare that what we claim is—

1. In a gas-regulator, the combination, with the breeches-pipe N, of the rod G, carrying at its lower end the valve D and operating the valves C C', which close the main exits of the pipe N, substantially as and for the purpose specified.

2. In a gas-regulator, a breeches-pipe, N, fitted with valves C C', adapted to be operated by the weighted rod G, substantially in the manner and for the purpose specified.

3. In a gas-regulator, the combination, with the breeches-pipe N, of the valve D, secured upon the rod G in such manner that said valve D opens before the valves C or C', substantially as and for the purpose specified.

4. In a gas-regulator, the combination, with the breeches-pipe N, of valves C C', adapted to be successively operated by rod G, substantially in the manner and for the purpose specified.

5. In a gas-regulator, the combination, with the weighted rod G, of rollers E E', of different diameters, for the purpose of operating successively the valves C C', substantially as specified.

6. A compound gas-pressure regulator having two superposed regulating-chambers, each provided with vertically-operating valves and valve rods, weighted or spring-impelled levers connected to each rod, and an adjustable rod connecting the outer or free ends of such levers, as set forth.

JOHANNES FLEISCHER.
HIERONYMUS WILHELM MÜLLER.
JOHANN GEORG ARNOLD.

Witnesses:
ROBT. M. HOOPER,
ADOLPHE BOETTCHER.